(12) United States Patent
Mikami (10) Patent No.: US 8,867,105 B2
(45) Date of Patent: Oct. 21, 2014

(54) ORIGINAL READING APPARATUS WITH VARIABLE GAIN AMPLIFICATION

(75) Inventor: Ryo Mikami, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 451 days.

(21) Appl. No.: 13/208,961

(22) Filed: Aug. 12, 2011

(65) Prior Publication Data

US 2012/0044543 A1    Feb. 23, 2012

(30) Foreign Application Priority Data

Aug. 19, 2010   (JP) .................................. 2010-184004

(51) Int. Cl.
  H04N 1/40      (2006.01)
  H04N 1/401     (2006.01)
(52) U.S. Cl.
  CPC ........... *H04N 1/401* (2013.01); *H04N 1/40056* (2013.01)
  USPC ........... 358/446; 358/406; 358/509; 358/445; 358/461
(58) Field of Classification Search
  CPC ............................ H04N 1/40056; H04N 1/401
  USPC ......... 358/406, 504, 509, 475, 446, 445, 474, 358/461, 512, 514, 505
  See application file for complete search history.

(56) References Cited

U.S. PATENT DOCUMENTS

| | | | | |
|---|---|---|---|---|
| 4,660,082 A | * | 4/1987 | Tomohisa et al. | 348/615 |
| 4,868,685 A | * | 9/1989 | Ueno | 358/461 |
| 5,111,309 A | * | 5/1992 | Sakata | 358/3.22 |
| 5,151,796 A | * | 9/1992 | Ito et al. | 358/461 |
| 5,157,518 A | * | 10/1992 | Ohtaki et al. | 358/461 |
| 5,402,249 A | * | 3/1995 | Koseki et al. | 358/446 |
| 5,703,454 A | * | 12/1997 | Taguchi | 318/685 |
| 6,266,089 B1 | * | 7/2001 | Shimamura | 348/301 |
| 2002/0002410 A1 | * | 1/2002 | Tomita et al. | 700/67 |
| 2005/0254102 A1 | * | 11/2005 | Kagami | 358/474 |
| 2008/0024842 A1 | * | 1/2008 | Tsukahara et al. | 358/505 |
| 2008/0068467 A1 | * | 3/2008 | Kanno et al. | 348/222.1 |
| 2008/0212146 A1 | * | 9/2008 | Tsukahara et al. | 358/446 |

FOREIGN PATENT DOCUMENTS

| | | |
|---|---|---|
| JP | 09-018712 | 1/1997 |
| JP | H09-65121 A | 3/1997 |
| JP | 2010-103911 | 5/2010 |

OTHER PUBLICATIONS

Japanese Office Action dated Jul. 29, 2014, in counterpart Japanese Patent Application No. 2010-184004, and English language translation thereof.

* cited by examiner

*Primary Examiner* — Jeremiah Bryar
*Assistant Examiner* — Quyen V Ngo
(74) *Attorney, Agent, or Firm* — Fitzpatrick, Cella, Harper & Scinto

(57) ABSTRACT

An original reading apparatus including: a light source configured to illuminate an original; a line image sensor configured to convert light reflected from the original into an analog output signal; an AD converter configured to convert the analog output signal output from the line image sensor into a digital output signal; a control device configured to control the line image sensor and the AD converter; and a variable gain amplifier provided inside the line image sensor, for adjusting a signal range of the analog output signal.

4 Claims, 12 Drawing Sheets

ORIGINAL READING APPARATUS WITH VARIABLE GAIN AMPLIFICATION

BACKGROUND OF THE INVENTION

1. Field of the Invention

The present invention relates to an original reading apparatus for reading an image of an original.

2. Description of the Related Art

Figure 9:
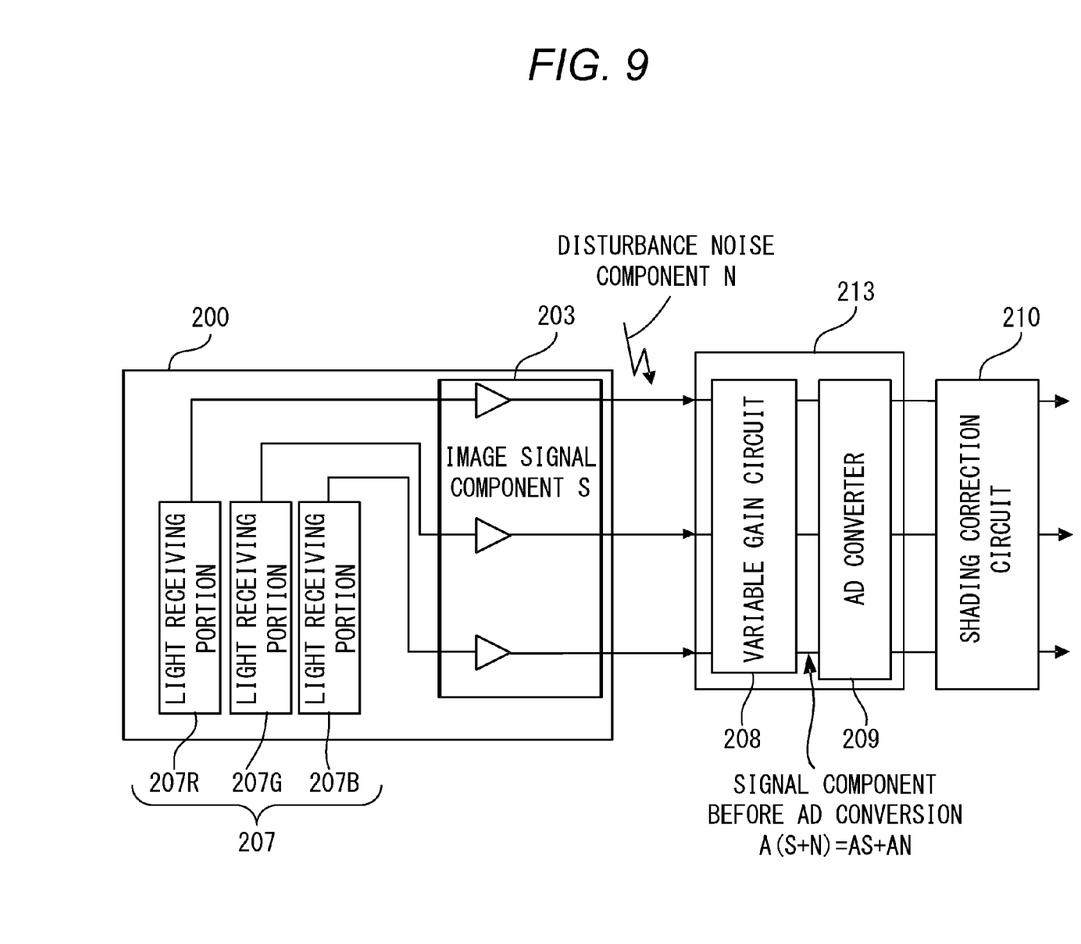
FIG. 9 is a diagram illustrating a flow of image signals in a conventional image reading apparatus.

An image reading apparatus reads an image of an original and converts read information into digital data. The image reading apparatus can read a monochrome image and a color image. The image reading apparatus can be provided in an image forming apparatus, such as a copying machine and a facsimile machine. FIG. 9 is a diagram illustrating a flow of image signals in a conventional image reading apparatus.

A line image sensor 200 includes a light receiving portion 207 and an output amplifier 203 serving as an output buffer unit for outputting a signal from the light receiving portion 207 to the outside. The light receiving portion 207 includes a light receiving portion 207R provided with a red color (R) filter, a light receiving portion 207G provided with a green color (G) filter, and a light receiving portion 207B provided with a blue color (B) filter. The output amplifier 203 included in the line image sensor 200 is electrically connected to an AD converter with variable gain circuit 213. The AD converter with variable gain circuit 213 includes a variable gain circuit 208 and an AD converter 209. The AD converter with variable gain circuit 213 is electrically connected to a shading correction circuit 210. The shading correction circuit 210 corrects unevenness in digital output signals in a main scanning direction caused by fluctuations in characteristic of optical systems for illuminating an original and fluctuations in characteristic of each pixel of the line image sensor.

How to adjust the variable gain circuit 208 before reading an original will be described. In general, the gain of the variable gain circuit 208 is adjusted so that analog output signals of the line image sensor 200 may fall within an allowable input range of the AD converter 209. The reason will be described below. The following description is an example in which the AD converter 209 has an allowable input range of from 0 V to 1 V with a resolution of 10 bits. When the gain of the variable gain circuit 208 is 1 and the range of the analog output signals output from the output amplifier 203 is from 0 V to 1 V, the resolution of 10 bits (=1,024 gray levels) can be obtained. However, when the range of the analog output signals output from the output amplifier 203 is from 0 V to 0.5 V, the resolution is reduced to 9 bits (=512 gray levels). In this case, the resolution of 10 bits can be acquired by setting the gain of the variable gain circuit 208 to 2 to expand the input range of the AD converter 209 to a range of from 0 V to 1 V. In an actual procedure, a gain adjustment operation for the variable gain circuit 208 is carried out before the operation of reading an original. In the gain adjustment operation, the gain of the variable gain circuit 208 is set to 1, and a white reference plate is read. The white reference plate is a reference for a highest brightness and provided in the image reading apparatus. If the analog output signal input to the variable gain circuit 208 is below 1 V, the reciprocal of the analog output signal is set as the gain. For example, if the analog output signal is 0.75 V, the gain of the variable gain circuit 208 is set to 4/3. In this way, image data can be read with the most significant bit of the AD converter 209.

Figure 10:
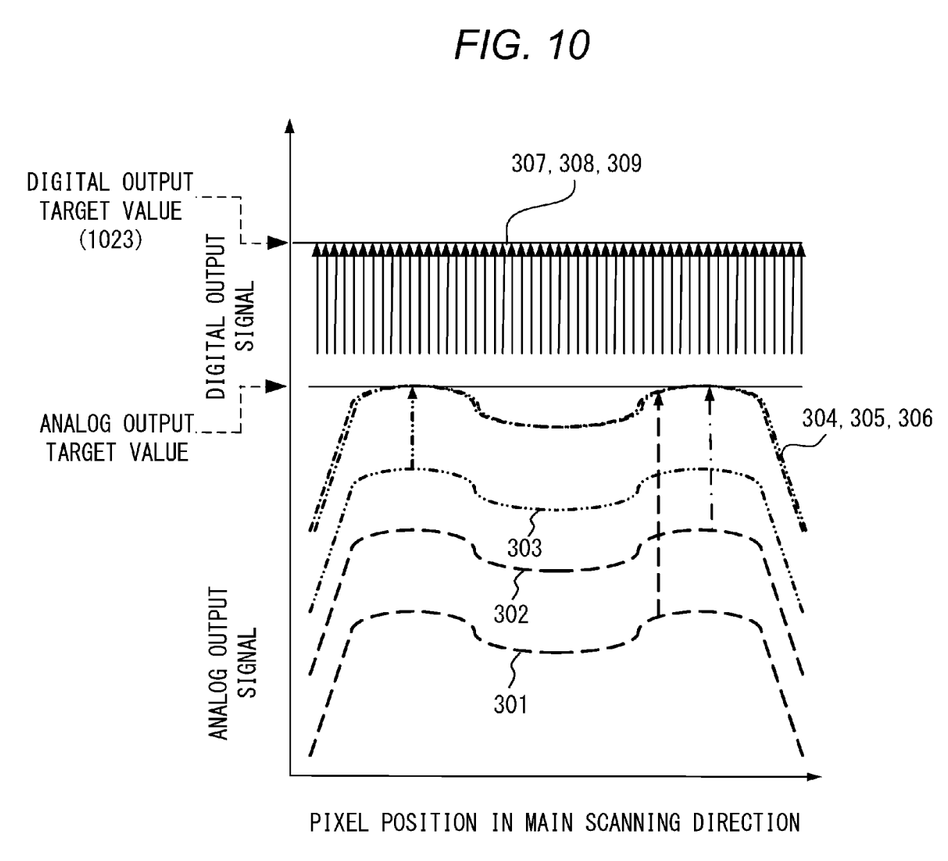
FIG. 10 is a graph showing the levels of output signals with respect to a pixel position in a main scanning direction in the conventional image reading apparatus.

FIG. 10 is a graph showing the levels of analog output signals and digital output signals with respect to a pixel position in the main scanning direction. Referring to FIG. 10, shading correction to be carried out by the shading correction circuit 210 will be described. The shading correction is performed for correcting unevenness in digital output signals in the main scanning direction (line direction) caused by fluctuations in characteristic of optical systems (not shown) for illuminating an original to form an image and fluctuations in characteristic of each pixel of the line image sensor 200. In FIG. 10, the horizontal axis represents the pixel position in the main scanning direction of the line image sensor 200, and the vertical axis represents the levels of the analog output signals of the line image sensor 200 and the levels of the digital output signals converted by the AD converter 209. In FIG. 10, curves 301, 302, and 303 represent profiles of the analog output signals which are output from the light receiving portions 207R, 207G, and 207B, respectively, when the white reference plate is read. In this case, the gain of the variable gain circuit 208 is set to 1. Curves 304, 305, and 306 represent profiles of the analog output signals from the light receiving portions 207R, 207G, and 207B, respectively, which have been amplified by the variable gain circuit 208 in which the gain is adjusted to satisfy the most significant bit of the AD converter 209.

As can be understood from the curves 304 to 306 of FIG. 10, the levels of the analog output signals in the line direction of the line image sensor 200 are not uniform even though the white reference plate having uniform brightness in the main scanning direction has been read. The non-uniformity results from unevenness in imaging systems, optical systems, and sensor systems in the main scanning direction. In order to correct the non-uniformity, the shading correction circuit 210 calculates a digital gain for each pixel so as to obtain a digital output signal of a predetermined value (digital output target value). The digital output target value (shading target) to be set for calculating the digital gain is 1,023. The gain for obtaining the digital output signal of 1,023 is calculated for each pixel. As a result, when the white reference plate is read, the digital output signals output from the shading correction circuit 210 can be made uniform in the line direction as indicated by solid lines 307, 308, and 309.

Also in a monochrome sensor, the same as described in the above-mentioned color line image sensor is applied. Regarding analog signals of the monochrome sensor, the gain of an external variable gain circuit is adjusted so that the analog signals may take a value close to an allowable input range of an AD converter. After that, digital output signals from the AD converter are corrected by a shading correction circuit so as to be uniform in the main scanning direction (Japanese Patent Application Laid-Open No. H09-65121).

In the conventional technology, as illustrated in FIG. 9, in a path (transmission line) between the line image sensor 200 and the AD converter with variable gain circuit 213, a disturbance noise component N may be superimposed on the analog output signal (image signal component S) output from the output amplifier 203. In this case, a signal component to be input to the variable gain circuit 208 is the image signal component S with the disturbance noise component N added. When the gain of the variable gain circuit 208 is represented by A (where A>1), a signal component amplified by the variable gain circuit 208 before the AD converter 209 is $A \times (S+N) = A \times S + A \times N$. Therefore, there is a problem that the disturbance noise component N is also amplified by the gain A similarly to the image signal component S.

SUMMARY OF THE INVENTION

In order to solve the above-mentioned problem, an original reading apparatus according to the present invention includes: a light source configured to illuminate an original; a reference member; a line sensor chip including, a light receiving portion configured to receive reflection light reflected from the original, to output an analog signal corresponding to incident light intensity, the light receiving portion having a plurality of pixels, an amplifier configured to amplify the analog signal output from the light receiving portion by using a gain corresponding to positions of the pixels, and an output terminal configured to output the amplified analog signal; an AD converter configured to convert the analog signal output from the line sensor chip into a digital signal; a shading correction unit configured to perform shading correction on the digital signal output from the AD converter by using shading correction data corresponding to the positions of the pixels; and a setting portion configured to set the gain of the amplifier and the shading correction data based on the digital signal corresponding to reflection light from the reference member, the digital signal being obtained by using the line sensor chip and the AD converter, wherein the setting portion sets the gain of the amplifier corresponding to the positions of the pixels by using the digital signal into which the AD converter converts the analog signal corresponding to the reflection light from the reference member, the analog signal being output from the line sensor chip by using the amplifier in which a predetermined gain is set, and the setting portion sets the shading correction data corresponding to the positions of the pixels by using the digital signal into which the AD converter converts the analog signal corresponding to the reflection light from the reference member, the analog signal being output from the line sensor chip by using the set gain as the gain of the amplifier.

Further features of the present invention will become apparent from the following description of exemplary embodiments with reference to the attached drawings.

DESCRIPTION OF THE EMBODIMENT (Image Reading Apparatus)

Figure 7:
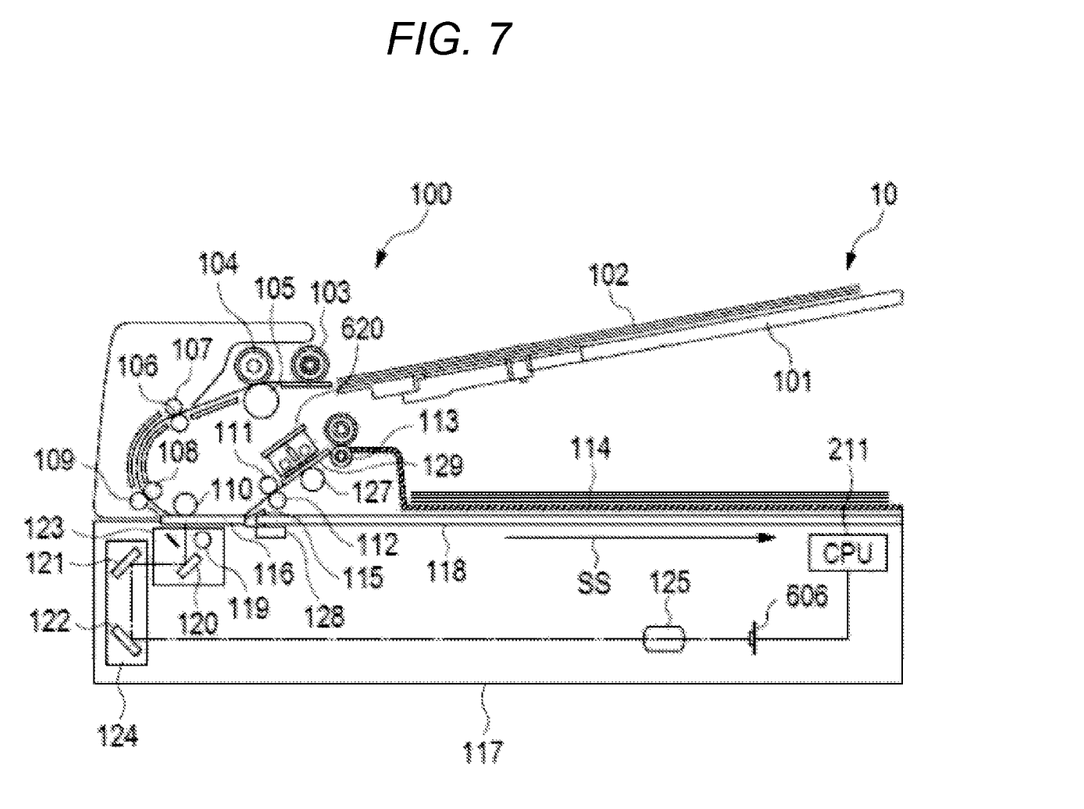
FIG. 7 is a schematic diagram of the image reading apparatus according to the embodiment of the present invention.
Figure 8:
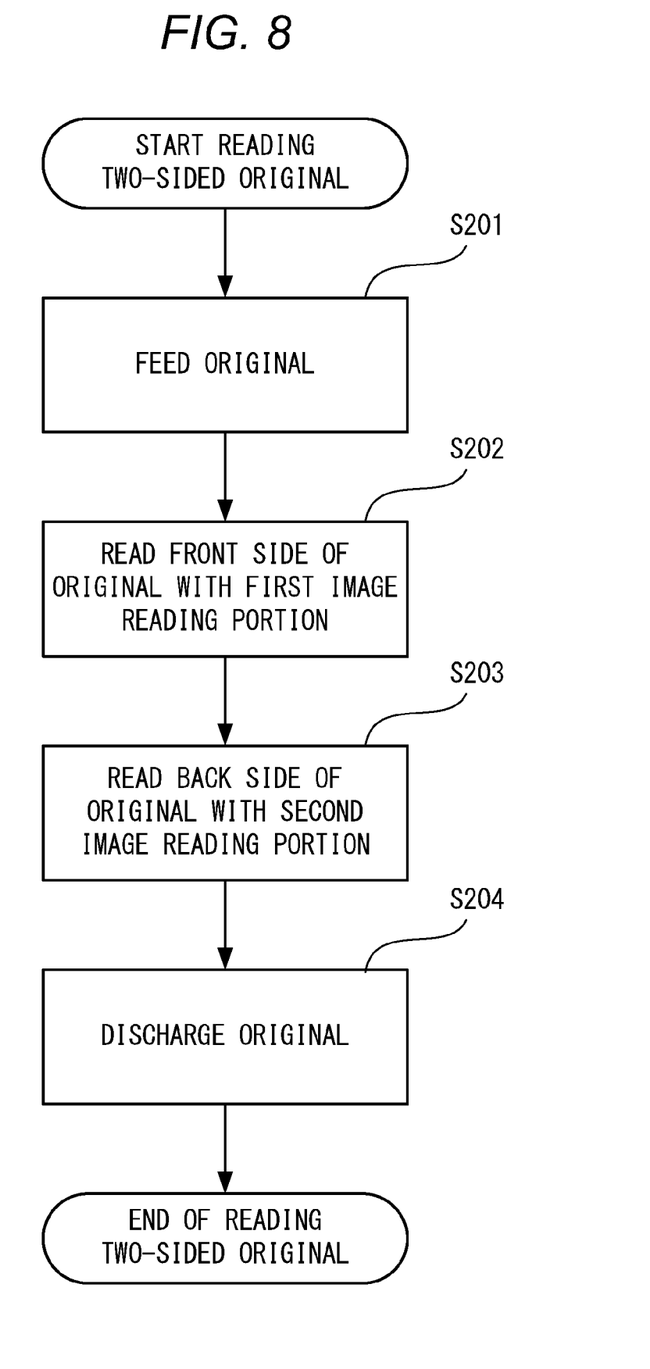
FIG. 8 is a flowchart illustrating a procedure of reading images of a two-sided original.

FIG. 7 is a schematic diagram of an image reading apparatus (an original reading apparatus) 10 according to an embodiment of the present invention. FIG. 8 is a flowchart illustrating a procedure of reading images of a two-sided original. Referring to FIGS. 7 and 8, a configuration of the image reading apparatus 10 and a process of reading a two-sided original by the image reading apparatus 10 will be described.

The image reading apparatus 10 comprises an automatic original feeding apparatus 100 and an image reading apparatus main body 117. The image reading apparatus 10 is provided with a CPU (a control device) 211 configured to control the automatic original feeding apparatus 100 and the image reading apparatus main body 117. The automatic original feeding apparatus 100 has an original tray 101 on which originals 102 are stacked. A feed roller 103 is provided downstream of the original tray 101. The feed roller 103 is pivotally supported by an arm (not shown) so as to move vertically as the arm (not shown) swings. In order not to encumber an operation of setting the original 102 onto the original tray 101, the feed roller 103 is normally retracted to an upward position, namely a home position. The feed roller 103 and a separation conveyance roller 104 are connected to a driving motor (not shown) as the same driving source.

The image reading apparatus 10 is provided with an operation portion (not shown). When the user operates the operation portion (not shown), or in response to an instruction from an external computer, the CPU 211 starts two-sided original reading processing (FIG. 8). Upon the start of a feed operation, the feed roller 103 lowers and comes into contact with an upper surface of the original 102. The CPU 211 rotates the driving motor (not shown) so that the feed roller 103 feeds the original 102 placed on the original tray 101 to the separation conveyance roller 104 (Step S201).

A separation conveyance driven roller 105 is disposed opposite to the separation conveyance roller 104 and pressed against the separation conveyance roller 104. The separation conveyance driven roller 105 is formed of a rubber material having a slightly lower coefficient of friction than that of the separation conveyance roller 104. The separation conveyance roller 104 cooperates with the separation conveyance driven roller 105 to separate and convey the original 102 fed by the feed roller 103, one by one.

The leading edge of the original 102 conveyed by the separation conveyance roller 104 and the separation conveyance driven roller 105 abuts against a nip portion between a stationary registration roller 106 and a stationary registration driven roller 107. By forming a loop in the original 102, the leading edge of the original 102 is aligned with the nip portion to correct skew feed of the original 102. The separation conveyance roller 104 and the separation conveyance driven roller 105 are rotated to convey the original 102 to a read roller 108.

The read roller 108 and a read driven roller 109 together convey the original 102 to a first flow-reading glass 116. A platen roller 110 is disposed opposite to the first flow-reading glass 116. An image on the front side of the original 102 passing on the first flow-reading glass 116 is read by a first line image sensor 606 described later (Step S202). A jump ramp 115 is disposed adjacent to the first flow-reading glass 116. The original 102 is scooped up by the jump ramp 115 to be conveyed to a read discharge roller 111 and a read discharge driven roller 112.

The original 102 is conveyed by the read discharge roller 111 and the read discharge driven roller 112 to a second flow-reading glass 129. A platen roller 127 is disposed opposite to the second flow-reading glass 129. A second line image sensor 620 is disposed on the side opposite to the platen roller 127 with respect to the second flow-reading glass 129. In this case, the platen rollers 110 and 127 each serve also as a white reference member for detecting and correcting temporal fluctuations in light intensity during flow-reading. In general, a density-controlled, white roller is used as the platen rollers 110 and 127. An image on the back side of the original 102 passing on the second flow-reading glass 129 is read by the second line image sensor 620 (Step S203). After the second line image sensor 620 finishes reading the image on the back side of the original 102, a delivery roller 113 discharges the original 102 to a delivery tray 114 (Step S204). The CPU 211 ends the two-sided original reading processing.

The image reading apparatus main body 117 comprises an original illuminating light source 119 configured to illuminate the original 102 passing on the first flow-reading glass 116, and mirrors 120, 121, and 122 configured to guide light reflected from the original 102 to a lens 125. The original illuminating light source 119 and the mirror 120 are mounted on a first mirror stand 123. Further, the mirrors 121 and 122 are mounted on a second mirror stand 124. The first mirror stand 123 and the second mirror stand 124 are coupled to a driving motor 240 (FIG. 4) via wire (not shown) so as to move in a direction parallel to an original table glass 118 as the driving motor 240 rotates. The reflection light from the original 102 is guided to the lens 125 through the mirrors 120, 121, and 122, then forming an image on a light receiving portion 600 of the first line image sensor 606 by the lens 125. The first line image sensor 606 performs photoelectric conversion on the imaged reflection light to output an electric signal corresponding to incident light intensity. Similarly to the first line image sensor 606, the second line image sensor 620 also performs photoelectric conversion on light reflected from the original 102 by a light receiving element to output an electric signal corresponding to incident light intensity.

The image reading apparatus 10 has a stationary reading mode in which the original 121 placed on the original table glass 118 is read while moving the first mirror stand 123 and the second mirror stand 124 in a sub-scanning direction (direction indicated by the arrow SS of FIG. 7). The image reading apparatus 10 also has a flow-reading mode in which an image of the original 102 conveyed by the automatic original feeding apparatus 100 is read on the first flow-reading glass 116 in the state in which the first mirror stand 123 and the second mirror stand 124 are stopped. The image reading apparatus 10 can read an image on the front side of the original 102 in a selected one of the two modes. In the flow-reading mode, the image reading apparatus 10 can also read an image on the back side of the original 102 by the second line image sensor 620 via the second flow-reading glass 129.

(Circuit of Line Image Sensor)

Figure 1:
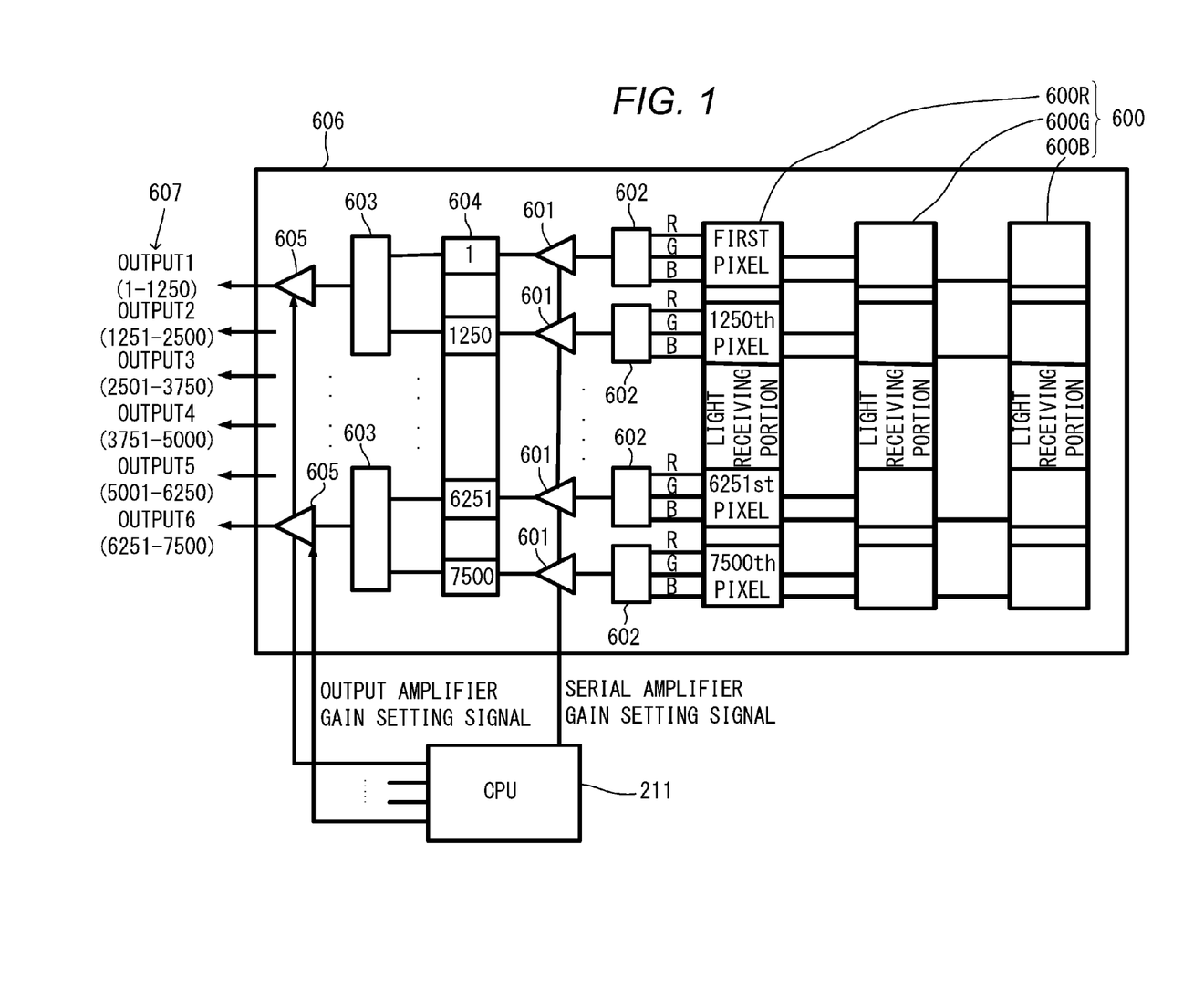
FIG. 1 is a diagram illustrating a circuit of a line image sensor.

FIG. 1 is a diagram illustrating a circuit of the first line image sensor 606. Referring to FIG. 1, the first line image sensor 606 of the image reading apparatus 10 will be described. Each of the first line image sensor 606 and the second line image sensor 620 is a color line image sensor configured to convert light reflected by an original into a plurality of color electric signals. Note that, the second line image sensor 620 is similar to the first line image sensor 606, and hence description thereof is omitted. Hereinafter, the first line image sensor 606 is simply referred to as a line image sensor 606.

The line image sensor 606 is an integrated circuit, and is a sensor chip. The line image sensor 606 includes the light receiving portion 600. The light receiving portion 600 comprises a light receiving portion 600R, a light receiving portion 600G, and a light receiving portion 600B. The light receiving portion 600R is an element having sensitivity to the wavelength band (long wavelength) of red color, for receiving light belonging to red color and converting the light into an electric signal. The light receiving portion 600G is an element having sensitivity to the wavelength band of green color, for receiving light belonging to green color and converting the light into an electric signal. The light receiving portion 600B is an element having sensitivity to the wavelength band of blue color, for receiving light belonging to blue color and converting the light into an electric signal. For example, with respect to light containing optical components of the entire wavelength range, such as white light, the light receiving portions 600R, 600G, and 600B each outputs an analog signal (electrically continuous signal) corresponding to brightness of the light. The light receiving portions 600R, 600G, and 600B each include 7,500 pixels arrayed in the line direction (main scanning direction). The number of pixels of the light receiving portion 600 illustrated in FIG. 1 is merely an example and not limited to 7,500.

Selectors 602 are connected to the light receiving portions 600R, 600G, and 600B. The selector 602 is provided for each pixel of the light receiving portion 600. Specifically, a selector 602 is connected to the first pixel of the light receiving portion R, the first pixel of the light receiving portion G, and the first pixel of the light receiving portion B. Another selector 602 is connected to the 1,250th pixel of the light receiving portion R, the 1,250th pixel of the light receiving portion G, and the 1,250th pixel of the light receiving portion B. The selector 602 is capable of temporally selecting analog signals output from the light receiving portions 600R, 600G, and 600B. A serial amplifier 601 is provided for each pixel of the light receiving portion 600. The serial amplifier 601 outputs, to a line memory 604, an analog signal output from any one of the light receiving portions 600R, 600G, and 600B selected by the selector 602. How to set the gain of the serial amplifier 601 will be described later. The serial amplifier 601 is capable of changing the gain with respect to each of the analog signals output from the light receiving portions 600R, 600G, and 600B. In other words, the serial amplifier 601 is capable of independently adjusting the gain for each of R, G, and B. The gain of the serial amplifier 601 is set by a serial amplifier gain setting signal supplied from the CPU 211. The line memory 604 temporarily holds the analog signal output from the serial amplifier 601.

A selector 603 sequentially selects the analog signals held in the line memory 604 in chronological order and outputs the selected analog signal to an output amplifier 605. In this embodiment, the number of pixels of the light receiving portion 600 is 7,500, in which the pixels are divided into six regions. To each of the six regions, the selector 603, the output amplifier 605, and an output terminal 607 are allocated. In this embodiment, the number of the output terminals 607 (OUTPUT1 to OUTPUT6) is six. However, the number of the output terminals 607 is varied depending on the number of the selectors 603 and hence not limited to six as in this embodiment. The output amplifier 605 outputs an analog signal selectively read by the selector 603 to the output terminal 607. How to set the gain of the output amplifier 605 will be described later. The output amplifier 605 is capable of setting the gains with respect to the analog signals which are output from the respective pixels of the light receiving portion 600 arrayed in the main scanning direction, that is, with respect to the analog signals to be output from a corresponding one of the OUTPUT1 to OUTPUT6 of the output terminals 607. In other words, the output amplifier 605 is capable of independently adjusting the gain for each of the multiple regions of the light receiving portion 600 of the line image sensor 606 divided in the main scanning direction. The gain of the output amplifier 605 is set by an output amplifier gain setting signal supplied from the CPU 211. The OUTPUT1 of the output terminal 607 outputs analog signals of the first to 1,250th pixels. The OUTPUT2 outputs analog signals of the 1,251st to 2,500th pixels. The OUTPUT3 outputs analog signals of the 2,501st to 3,750th pixels. The OUTPUT4 outputs analog signals of the 3,751st to 5,000th pixels. The OUTPUT5 outputs analog signals of the 5,001st to 6,250th pixels. The OUTPUT6 outputs analog signals of the 6,251st to 7,500th pixels.

(Operation of Line Image Sensor)

Figure 2A:
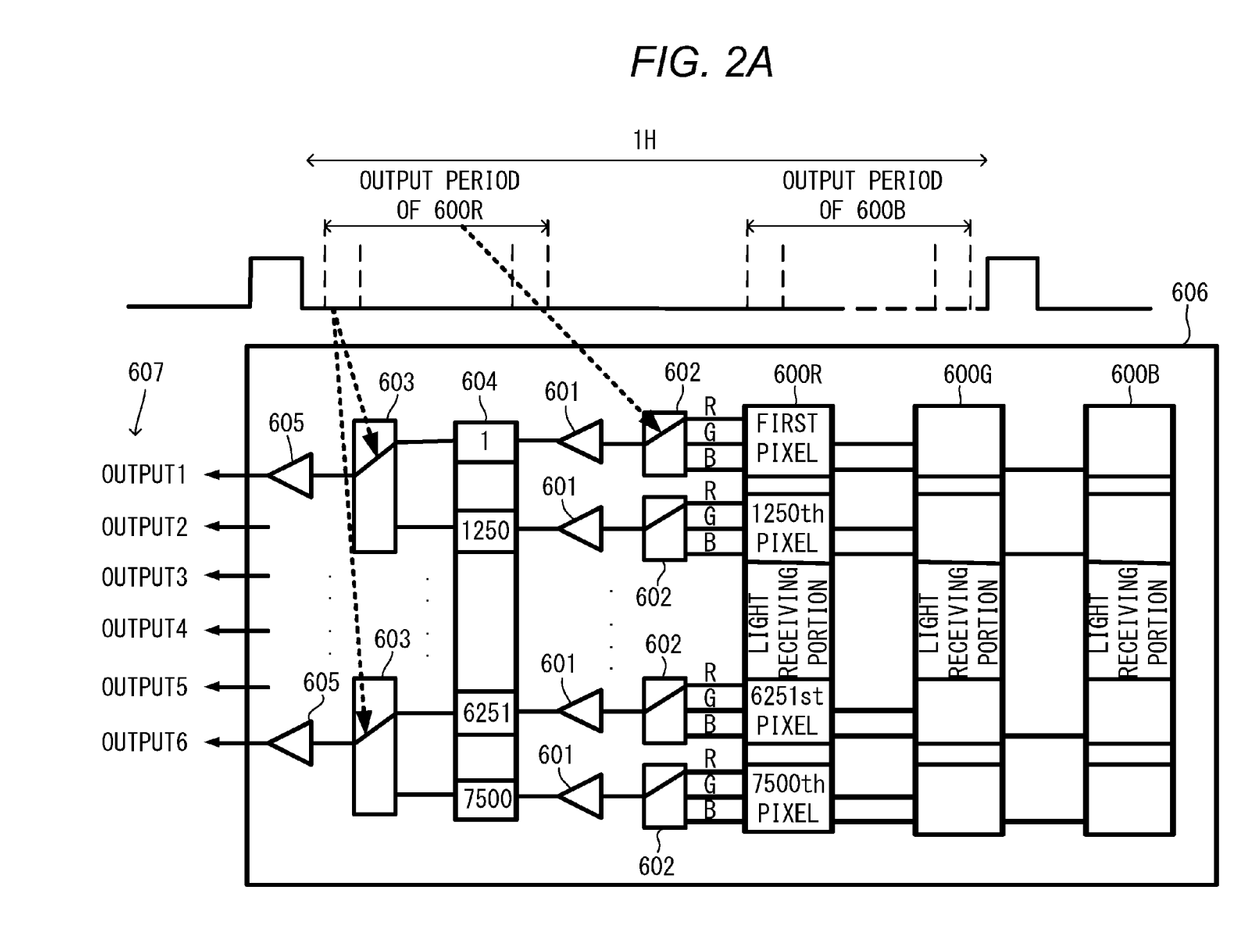
FIGS. 2A, 2B, and 2C are diagrams illustrating an operation of the line image sensor.
Figure 2B:
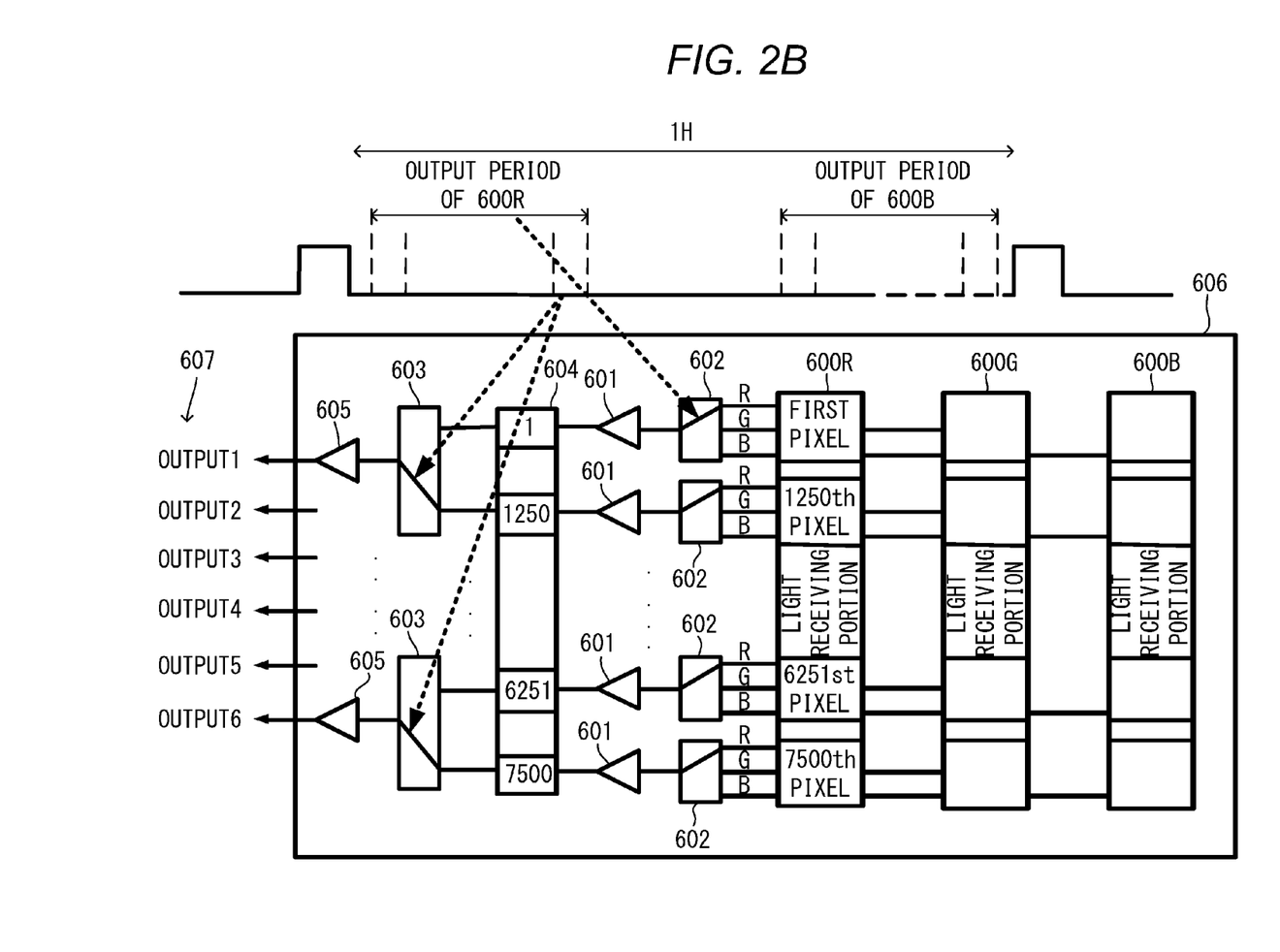
Figure 2C:
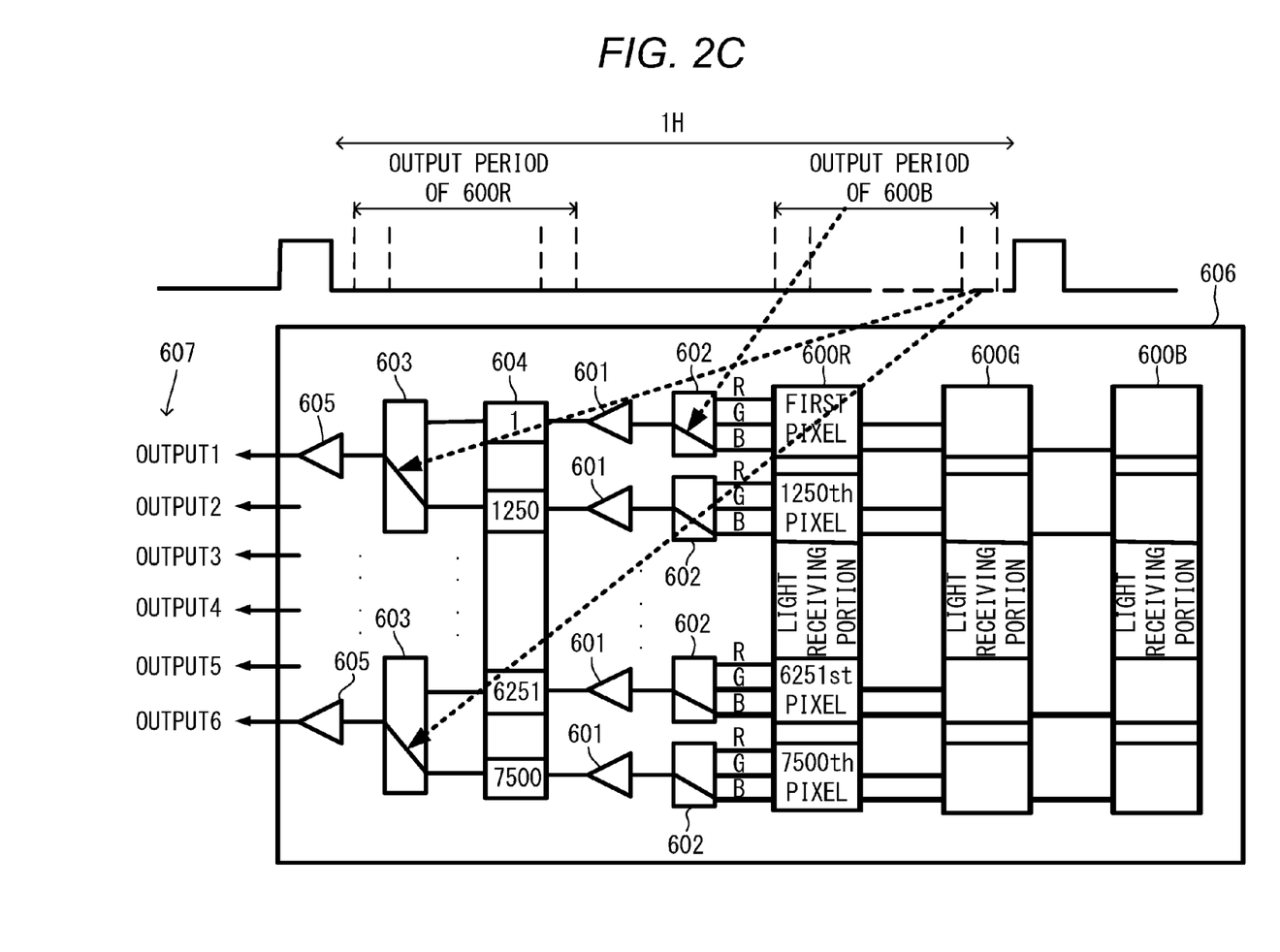

FIGS. 2A to 2C are diagrams illustrating an operation of the line image sensor 606. Referring to FIGS. 2A to 2C, a basic operation of the line image sensor 606 for outputting analog signals will be described. In FIGS. 2A to 2C, an entire output period 1H indicates a time period required for outputting analog output signals from all the pixels in the main scanning direction of the light receiving portions 600R, 600G, and 600B. FIG. 2A illustrates a state at the beginning of an "output period of the light receiving portion 600R". FIG. 2B illustrates a state at the last of the "output period of the light receiving portion 600R". FIG. 2C illustrates a state at the last of an "output period of the light receiving portion 600B".

In FIGS. 2A and 2B, the selectors (selecting devices) 602 each selects an analog signal output from the light receiving portion 600R. In other words, in the "output period of the light receiving portion 600R", the line memory 604 holds the analog output signals output from the light receiving portion 600R. Each of the six selectors 603 selects the analog signals held in the line memory 604 in chronological order and outputs the selected analog signal to the output amplifier 605. In the state at the beginning of the "output period of the light receiving portion 600R" illustrated in FIG. 2A, the selector 603 for the OUTPUT1 selects a signal of the first pixel. The selector 603 for the OUTPUT2 selects a signal of the 1,251st pixel. Similarly, the selectors 603 for the OUTPUT3 to the OUTPUT6 select signals of the 2,501st pixel, the 3,751st pixel, the 5,001st pixel, and the 6,251st pixel, respectively. In this case, the analog output signal of the first pixel of the light receiving portion 600R is output from the OUTPUT1 of the output terminal 607. The analog output signal of the 1,251st pixel is output from the OUTPUT2. Similarly, the analog output signal of the 2,501st pixel, the analog output signal of the 3,751st pixel, the analog output signal of the 5,001st pixel, and the analog output signal of the 6,251st pixel are output from the OUTPUT3 to the OUTPUT6, respectively.

In the "output period of the light receiving portion 600R", in the state in which the selectors 602 each is kept to select the analog signal output from the light receiving portion 600R, the selector 603 for the OUTPUT1 sequentially switches the selection to the second pixel, the third pixel, . . . , and the 1,250th pixel. Similarly, the selector 603 for the OUTPUT2 also sequentially switches the selection to the 1,252nd pixel, the 1,253rd pixel, . . . , and the 2,500th pixel. Similarly, the selectors 603 for the OUTPUT3 to the OUTPUT6 also sequentially switch the selections of the pixels. The selector 603 is capable of switching the selection in a time period obtained by equally dividing the "output period of the light receiving portion 600R" by a parameter (1,250 in this embodiment) of the selector 603.

FIG. 2B illustrates a state in which the selector 603 for the OUTPUT1 selects an analog signal of the 1,250th pixel as the last pixel in the "output period of the light receiving portion 600R". The selectors 603 for the OUTPUT2 to the OUTPUT6 select analog output signals of the 2,500th pixel, the 3,750th pixel, the 5,000th pixel, the 6,250th pixel, and the 7,500th pixel, respectively. At this time, the analog output signals of the 1,250th pixel, the 2,500th pixel, the 3,750th pixel, the 5,000th pixel, the 6,250th pixel, and the 7,500th pixel of the light receiving portion 600R are output from the OUTPUT1 to the OUTPUT6 of the output terminals 607, respectively.

When the "output period of the light receiving portion 600R" ends, the selectors 602 each selects an analog signal output from the light receiving portion 600G, starting an "output period of the light receiving portion 600G". An operation in the "output period of the light receiving portion 600G" is the same as the operation in the "output period of the light receiving portion 600R", and hence description thereof is omitted.

In the "output period of the light receiving portion 600B" illustrated in FIG. 2C, the selectors 602 each selects an analog signal output from the light receiving portion 600B. The selector 603 for the OUTPUT1 selects an analog output signal of the 1,250th pixel at the end of the "output period of the light receiving portion 600B". At this time, the analog output signal of the 1,250th pixel of the light receiving portion 600B is output from the OUTPUT1 of the output terminal 607. Similarly, analog output signals of the 2,500th pixel, the 3,750th pixel, the 5,000th pixel, the 6,250th pixel, and the 7,500th pixel of the light receiving portion 600B are output from the OUTPUT2 to the OUTPUT6 of the output terminals 607, respectively.

Figure 3:
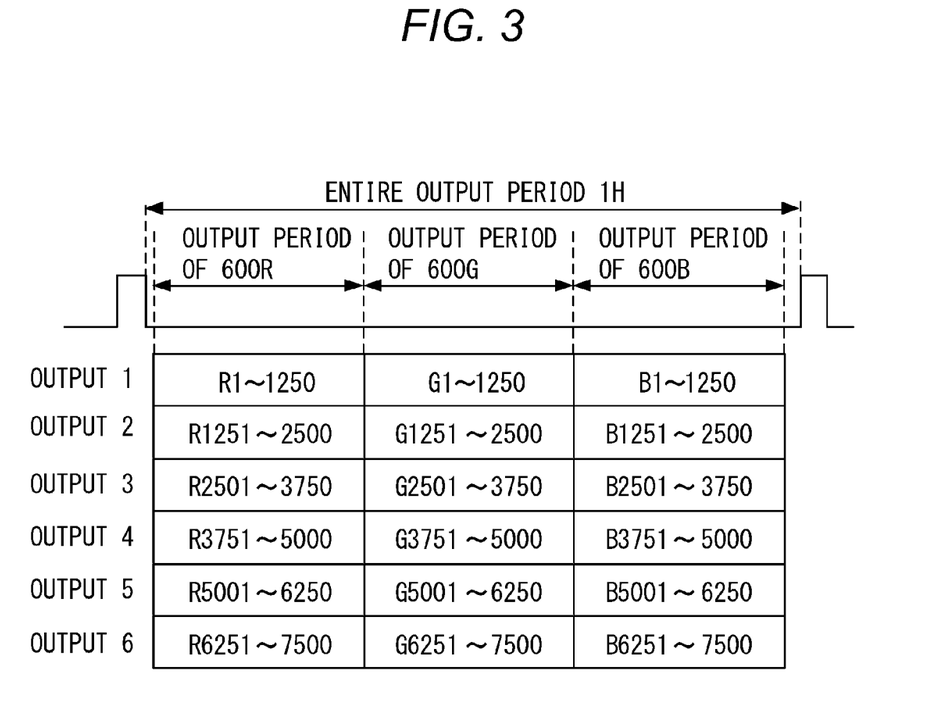
FIG. 3 is a diagram illustrating the output order of pixels of the line image sensor.

Through the operation of the line image sensor 606 described above, the output order of the pixels of the line image sensor 606 is determined as illustrated in FIG. 3.

(Flow of Image Signals)

Figure 4:
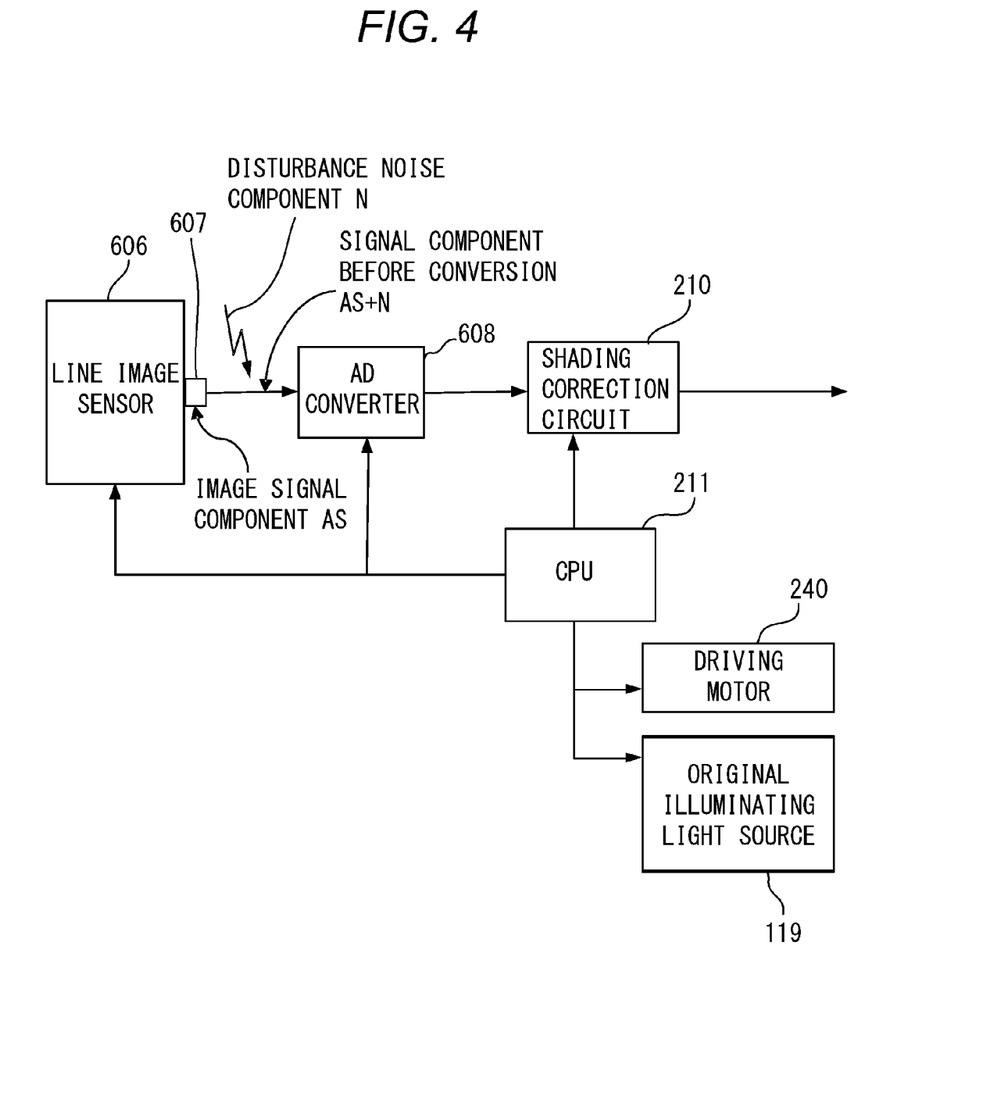
FIG. 4 is a diagram illustrating a flow of image signals in an image reading apparatus according to an embodiment of the present invention.

FIG. 4 is a diagram illustrating a flow of image signals in the image reading apparatus according to this embodiment. All the analog output signals (image signals) output from the six output terminals 607 of the line image sensor 606 have the same flow. Therefore, referring to FIG. 4, a flow of an image signal output from one of the output terminals 607 of the line image sensor 606 will be described.

The output terminal 607 of the line image sensor 606 is electrically connected to an AD converter 608. The AD converter 608 has, for example, an allowable input range of from 0 V to 1 V with a resolution of 10 bits. The AD converter 608 is electrically connected to a shading correction circuit 210. The line image sensor 606, the AD converter 608, and the shading correction circuit 210 are electrically connected to the CPU 211 and controlled by the CPU 211. The driving motor 240 configured to move the first mirror stand 123 and the second mirror stand 124 and the original illuminating light source 119 are electrically connected to the CPU 211 and controlled by the CPU 211.

Details of an image signal component S, a disturbance noise component N, and a signal component before AD conversion AS+N will be described later.

The image signal, which is an analog output signal output from the output terminal 607 of the line image sensor 606 at the time of reading the white reference plate, is input to the AD converter 608 and converted into a digital signal. The image signals converted into the digital signals have unevenness in the main scanning direction caused by imaging systems, optical systems, and sensor systems. In order to correct the unevenness in the digital signals in the main scanning direction, the shading correction circuit 210 calculates a digital gain for each pixel so that each of the digital signals reaches a predetermined digital output target value.

(Gain Adjustment)

Figure 5:
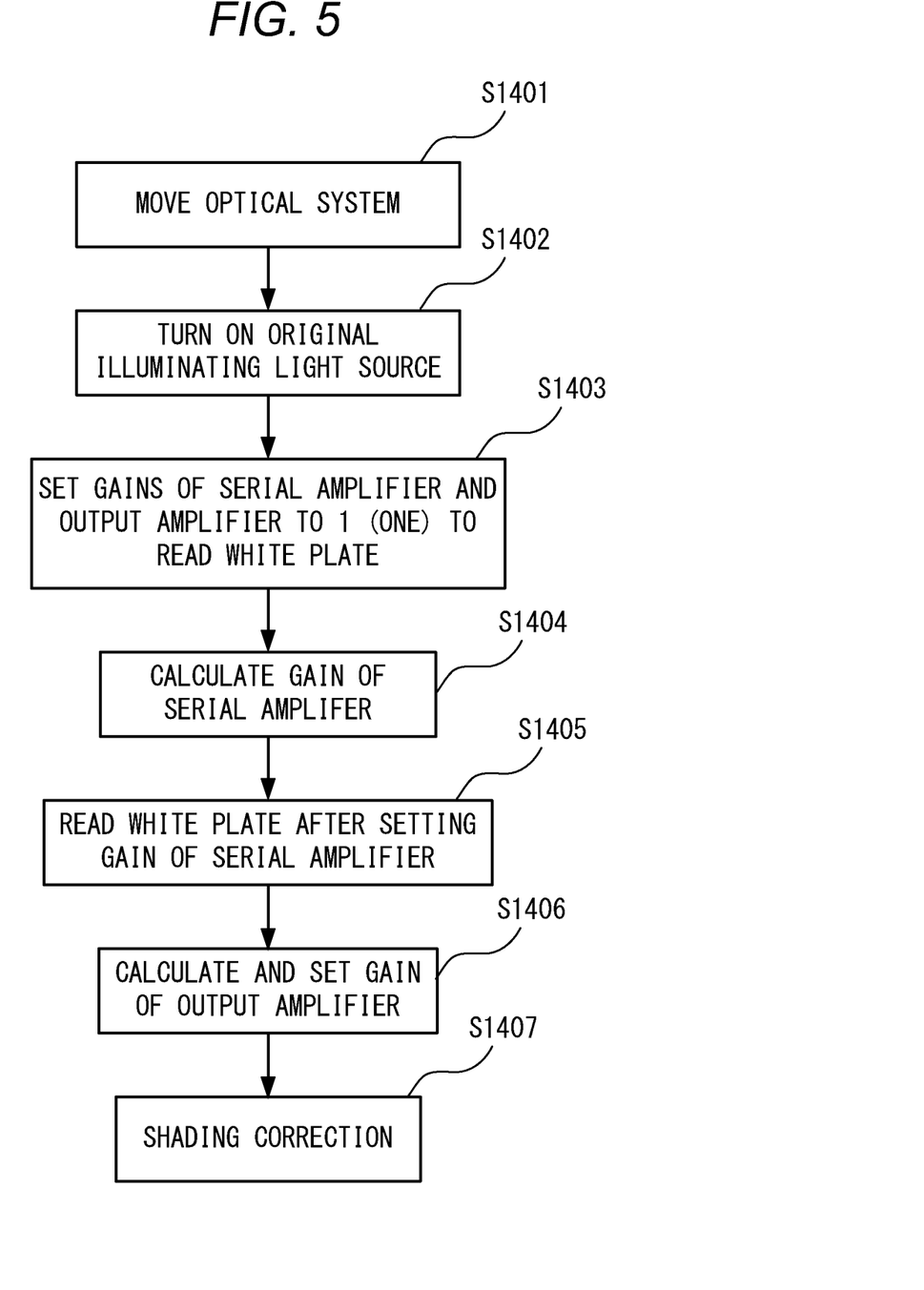
FIG. 5 is a flowchart for gain adjustment performed by a CPU.

FIG. 5 is a flowchart for gain adjustment performed by the CPU 211. The variable gain amplifier provided in the line image sensor 606 includes the serial amplifier 601 and the output amplifier 605. The respective gains of the serial amplifier 601 and the output amplifier 605 are adjusted so that a signal range of the analog output signal output from the line image sensor 606 falls within a preset range in the allowable input range of the AD converter 608. In this case, the signal range is a range of the magnitude of the voltage of the analog output signal. The serial amplifier 601 and the output amplifier 605 are provided as a variable gain amplifier inside the line image sensor 606.

Under one end portion of the original table glass 118 of the image reading apparatus 10, a white reference plate (a white reference member) 128 is provided as a reference for while level. The white reference plate 128 is disposed adjacent to the jump ramp 115.

In Step S1401, the CPU 211 moves the first mirror stand 123 and the second mirror stand 124 so that the line image sensor 606 may read the white reference plate 128. The CPU 211 may move the first mirror stand 123 and the second mirror stand 124 so that the line image sensor 606 may read the platen roller 110 as another white reference member, instead of the white reference plate 128.

A black reference (a black level) is adjusted so that an analog output signal which is obtained when the original illuminating light source 119 is turned OFF to read the white reference plate 128 may fall within a predetermined lower limit range of the allowable input range of the AD converter 608.

After that, in Step S1402, the CPU 211 turns ON the original illuminating light source 119.

Figure 6:
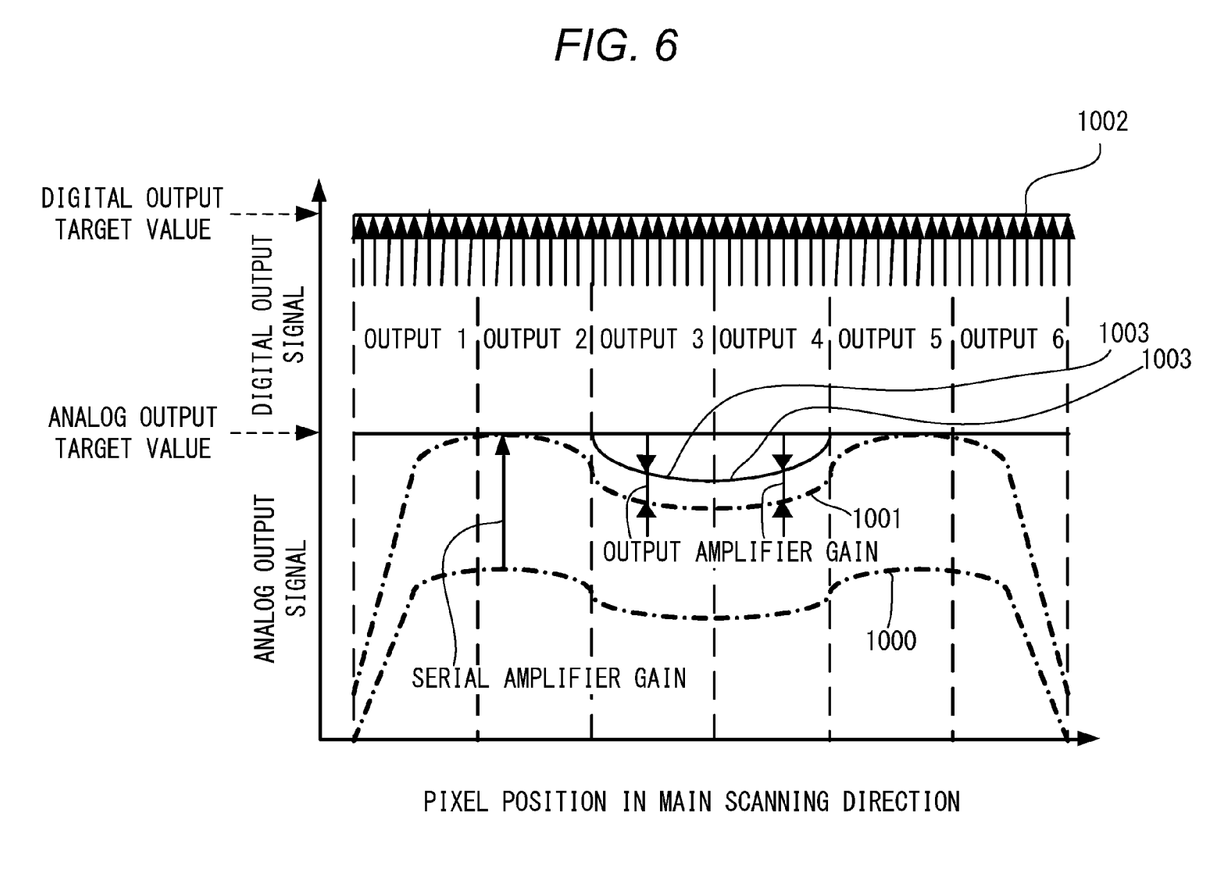
FIG. 6 is a graph showing the levels of output signals with respect to a pixel position in a main scanning direction according to the embodiment of the present invention.

In Step S1403, the CPU 211 sets the gains of the serial amplifier 601 and the output amplifier 605 built in the line image sensor 606 to 1 (one) to read data on the white reference plate 128. The serial amplifier 601 is capable of independently setting the gain with respect to each of the analog output signals of R, G, and B. The output amplifier 605 is capable of independently setting the gain with respect to each of the pixel regions divided into six in the line direction (each having 1,250 pixels). FIG. 6 is a graph showing the levels of the output signals of the light receiving portion 600R with respect to the pixel position in the main scanning direction. The light receiving portion 600G and the light receiving portion 600B are the same as in the light receiving portion 600R, and hence illustrations of the levels of the output signals of the light receiving portion 600G and the light receiving portion 600B are omitted. In FIG. 6, the horizontal axis represents the pixel position in the main scanning direction and the vertical axis represents the level of the output signal (brightness). A profile curve 1000 represents the levels of the output signals of the light receiving portion 600R with respect to the pixel position in the main scanning direction, which are obtained when the gain of the serial amplifier 601 is set to 1 to read the white reference plate 128.

The gain of the serial amplifier 601 related to the light receiving portion 600R is adjusted so that a maximum value of the profile curve 1000, that is, a maximum value of the analog output signals output from the light receiving portion 600R in the entire region in the main scanning direction may be approximated to an analog output target value (gain target). The analog output target value is an upper limit value of a preset range in the allowable input range of the AD converter 608. For example, when the AD converter 608 has a resolution of 10 bits, the analog output target value is an upper limit value of the analog output signals which can obtain the resolution of 10 bits.

In Step S1404, the CPU 211 calculates the gain of the serial amplifier 601 related to the light receiving portion 600R based on a ratio between the maximum value of the profile curve 1000 of the white reference plate 128 read in Step S1403 and the analog output target value. As illustrated in FIG. 1, the CPU 211 transmits the serial amplifier gain setting signal to the serial amplifier 601 to set the gain of each serial amplifier 601.

As described above with reference to FIGS. 2A to 2C and FIG. 3, the output periods of the light receiving portion 600R, the light receiving portion 600G, and the light receiving portion 600B are switched over so that the analog signals of R, G, and B are output from the output terminals 607 of the line image sensor 606. The set gain value of the serial amplifier 601 is switchable in response to the switching of the output periods of the light receiving portion 600R, the light receiving portion 600G, and the light receiving portion 600B. Therefore, the output periods of the light receiving portion 600R, the light receiving portion 600G, and the light receiving portion 600B are switched over to calculate the gains for the light receiving portion 600G and the light receiving portion 600B similarly to the light receiving portion 600R. Note that, the gains for R, G, and B to be set in the serial amplifier 601 have the same value for all the pixels in the main scanning direction, irrespective of the position of the light receiving portion 600 in the main scanning direction.

In Step S1405, the CPU 211 reads the white reference plate 128 after setting the gain calculated in Step S1404 to the serial amplifier 601. A profile curve 1001 of FIG. 6 represents the levels of the output signals of the light receiving portion 600R with respect to the pixel position in the main scanning direction, which are obtained when the gain calculated in Step S1404 is set to the serial amplifier 601 to read the white reference plate 128. A maximum value of the profile curve 1001 reaches the analog output target value. The serial amplifier 601 built in the line image sensor 606 is capable of setting, to each of the light receiving portion 600R, the light receiving portion 600G, and the light receiving portion 600B, a uniform gain (1 or larger) in the main scanning direction of the light receiving portion 600. If the profile curve 1000 of the light receiving portion 600R is almost flat in the main scanning direction, by simply setting the gain of the serial amplifier 601, the profile curve 1001 can be approximated to the analog output target value in all the pixel positions in the main scanning direction. Actually, however, the profile curve 1000 of the light receiving portion 600R may not be made flat in the main scanning direction because of illumination unevenness of the original illuminating light source 119, light intensity unevenness resulting from the reflection mirror 120 and the lens 125, and sensitivity unevenness of the pixels of the light receiving portion 600. Depending on discrepancies in light distribution of the line image sensor 606 in the main scanning direction, there is a problem in that a region in which the maximum value of the analog output signal after the gain adjustment cannot reach the analog output target value may exist. In other words, in a region in the main scanning direction, the gain can be adjusted so that the maximum value of the analog output signal may reach the analog output target value, but in another region in the main scanning direction, the maximum value of the analog output signal cannot reach the analog output target value. In this case, the resolution of the AD converter 608 varies in the main scanning direction, thus leading to a degraded image quality. For example, in the profile curve 1001 of FIG. 6, the region in which the maximum value of the analog output signal cannot reach the analog output target value through the setting of the gain of the serial amplifier 601 is a region of pixels corresponding to the OUTPUT3 and the OUTPUT4 of the output terminals 607.

In order to correct the variation in resolution of the AD converter 608, in S1406, the gain of the output amplifier 605 is set by calculation. As described above, the output amplifier 605 is capable of independently setting the gain for each of the OUTPUT1 to the OUTPUT6, which are divided into six in the line direction. The gain of the output amplifier 605 corresponding to the OUTPUT3 of the output terminal 607 of the line image sensor 606 is adjusted so that a maximum value of the analog output signal output from the OUTPUT3 may reach the analog output target value. Similarly, the gain of the output amplifier 605 corresponding to the OUTPUT4 is adjusted so that a maximum value of the analog output signal output from the OUTPUT4 may reach the analog output target value. In this way, in the entire region in the main scanning direction, the analog output signals can be approximated to the analog output target value. A profile curve 1003 of FIG. 6 represents the levels of the output signals from pixels of the light receiving portion 600R corresponding to the OUTPUT3 and the OUTPUT4 after the gains of the output amplifiers 605 are adjusted. In this case, ultimate analog output signals in the main scanning direction are represented by the profile curve 1001 in pixel regions for the OUTPUT1, the OUTPUT2, the OUTPUT5, and the OUTPUT6 and by the profile curve 1003 in pixel regions for the OUTPUT3 and the OUTPUT4. In the pixel regions for the OUTPUT1, the OUTPUT2, the OUTPUT5, and the OUTPUT6, the adjustment only to the gain of the serial amplifier 601 is sufficient to allow the maximum values of the analog output signals to reach an upper limit value of a preset range of the AD converter 608 (i.e., the analog output target value).

As described in the description on the output order of pixels with reference to FIG. 3, from each of the OUTPUT1 to the OUTPUT6 of the output terminals 607, all the analog output signals of R, G, and B for 1,250 pixel regions are output. For example, it is assumed that the gain of the output amplifier 605 is determined based on a minimum one of the analog output signals of R, G, and B. In this case, the same gain is set to the output amplifier 605 with respect also to a maximum one of the analog output signals of R, G, and B, thus causing a fear that the analog output signals to be output from the output terminals 607 may exceed the upper limit of the allowable input range of the AD converter 608. In view of this, the set gain value of the output amplifier 605 is determined based on a maximum one of the analog output signals of R, G, and B for each of the OUTPUT1 to the OUTPUT6.

The analog output signals from the output terminals 607 of the line image sensor 606 are sent to the AD converter 608. The analog output signals include analog output signals of the profile curve 1001, which are output from the OUTPUT1, the OUTPUT2, the OUTPUT5, and the OUTPUT6, and analog output signals of the profile curve 1003, which are output from the OUTPUT3 and the OUTPUT4. The analog output signals of the profile curve 1001, which are output from the OUTPUT1, the OUTPUT2, the OUTPUT5, and the OUTPUT6, are output through the gain adjustment to only the serial amplifier 601. The analog output signals of the profile curve 1003, which are output from the OUTPUT3 and the OUTPUT4, are output through the gain adjustment to both the serial amplifier 601 and the output amplifier 605. The CPU 211 causes the AD converter 608 to convert the analog output signals into digital output signals. The digital output signals from the AD converter 608 are sent to the shading correction circuit 210.

In Step S1407, the CPU 211 causes the shading correction circuit 210 to perform shading correction on the digital output signals. The shading correction circuit 210 corrects the digital output signal for each pixel into a digital output target value (shading target). A profile curve 1002 of FIG. 6 represents the levels of the digital output signals with respect to the pixel position in the main scanning direction, which are obtained after the shading correction. In this way, the levels of the digital output signals obtained at the time when the line image sensor 606 reads the white reference plate 128 are adjusted to be uniform in the main scanning direction.

According to this embodiment, by combining the functions of the serial amplifier 601 and the output amplifier 605, the analog output signals can be amplified inside the line image sensor 606, irrespective of the position in the main scanning direction.

Note that, in this embodiment, the analog output signal of lowest brightness and the lower limit of the allowable input range of the AD converter 608 are both set to 0 V. However, the present invention is not limited thereto. If each of the analog output signal of lowest brightness and the lower limit of the allowable input range of the AD converter 608 is a value other than 0 V, it is more preferred to set the gain based on the set values and the analog output signal which is obtained at the time of reading the white reference plate 128.

According to this embodiment, the gain of an amplifier configured to amplify the analog output signals output from the light receiving portion 600 can be set. In other words, the gain of an amplifier provided inside the line image sensor 606 can be set.

Further, the serial amplifier, which sets the gain with respect to each of the analog output signals of R, G, and B from the light receiving portion, and the output amplifier, which sets the gain with respect to each of the multiple regions divided in the main scanning direction, are provided inside the line image sensor 606. Owing to the output amplifier according to this embodiment, the difference in resolution of the AD converter 608 between the respective regions in the main scanning direction can be reduced. A combination of the serial amplifier and the output amplifier can obtain a more uniform, higher resolution of the AD converter 608 in the main scanning direction as compared to the conventional technology.

(Influence of Disturbance Noise)

In the conventional image reading apparatus illustrated in FIG. 9, in the path (transmission line) between the line image sensor 200 and the AD converter with variable gain circuit 213, disturbance noise may be superimposed on the analog output signal from the line image sensor 200 with a high possibility. The reason is because the gain processing is performed in the AD converter with variable gain circuit 213 provided outside the sensor chip as an integrated circuit. In other words, the analog output signal is susceptible to external noise because the path between the line image sensor 200 and the AD converter with variable gain circuit 213 is relatively long and the AD converter with variable gain circuit 213 is disposed outside the sensor chip. On the contrary, according to this embodiment, the serial amplifier 601 and the output amplifier 605 are provided inside the sensor chip (line image sensor 606). This configuration can reduce a path between the light receiving portion 600 and the serial amplifier 601 and a path between the serial amplifier 601 and the output amplifier 605, and also prevent the analog output signal from being easily affected by external noise. Accordingly, the possibility that external noise is superimposed on the analog output signal output from the light receiving portion 600 can be almost eliminated. Therefore, the analog output signal output from the line image sensor 606 according to this embodiment can be considered as being hardly affected by the influence of disturbance noise.

Referring to FIG. 4, the influence of disturbance noise according to this embodiment will be described. An overall gain A of the line image sensor 606 is the product of a gain A1 of the serial amplifier 601 and a gain A2 of the output amplifier 605. An analog output signal S from the light receiving portion 600 is amplified by the serial amplifier 601 and the output amplifier 605 inside the line image sensor 606, which is then output from the output terminal 607 as an image signal component A×S, where A=A1×A2 and A is larger than 1 (A>1). In the line image sensor 606, the analog output signal S is hardly affected by external noise. In the path between the line image sensor 606 and the AD converter 608, if a disturbance noise component N is superimposed on the image signal component A×S, a signal component before AD conversion performed by the AD converter 608 is A×S+N. The gain A is larger than 1, and hence, comparing to A×S+A×N in the conventional technology, A×S+A×N>A×S+N is established. In other words, this embodiment can reduce the influence of the disturbance noise component N which is undesirably superimposed on the image signal component S.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-184004, filed Aug. 19, 2010, which is hereby incorporated by reference herein in its entirety.

What is claimed is:

1. An original reading apparatus, comprising:
a light source configured to illuminate an original;
a reference member;
a line sensor chip;
an AD converter;
a shading correction unit; and
a setting portion;
wherein the line sensor chip comprises:
a first light receiving portion configured to receive reflection light reflected from the original and to output a first color analog signal corresponding to incident light intensity of a first color, the first light receiving portion having a plurality of pixels;
a second light receiving portion configured to receive reflection light reflected from the original and to output a second color analog signal corresponding to incident light intensity of a second color, the second light receiving portion having a plurality of pixels;
a plurality of first amplifiers corresponding to a plurality of positions of the pixels, the first amplifiers configured to amplify the first color analog signal by using a first gain corresponding to the first color and configured to amplify the second color analog signal by using a second gain corresponding to the second color;
a plurality of second amplifiers corresponding to a plurality of positions of the pixels, each of the second amplifiers configured to amplify the first and second color analog signals amplified by the first amplifiers by using a third gain corresponding to a position of a pixel; and
an output terminal configured to output the first and second color analog signals amplified by the second amplifiers;
wherein the AD converter is configured to convert the first and second color analog signals output from the output terminal into first and second digital signals;
wherein the shading correction unit is configured to perform shading correction on the first and second digital signals output from the AD converter by using shading correction data corresponding to a position of a pixel and a type of color; and
wherein the setting portion is configured to set the first, second and third gains and the shading correction data based on the first and second digital signals corresponding to reflection light from the reference member.

2. An original reading apparatus according to claim 1, wherein the line sensor chip further comprises a third light receiving portion configured to receive reflection light reflected from the original and to output a third color analog signal corresponding to incident light intensity of a third color, the third light receiving portion having a plurality of pixels, and
wherein the first color analog signal is a red color analog signal, the second color analog signal is a green color analog signal, and the third color analog signal is a blue color analog signal.

3. An original reading apparatus according to claim 1, wherein the output terminal has different output terminals for each of the second amplifiers.

4. An original reading apparatus according to claim 1, further comprising a line memory configured to store the first and second color analog signals amplified by the first amplifiers.

* * * * *